Patented June 21, 1932

1,863,962

UNITED STATES PATENT OFFICE

KENNETH GEORGE BIERLICH, OF BENNINGTON, VERMONT, ASSIGNOR OF ONE-FOURTH TO J. H. BIERLICH, OF BENNINGTON, VERMONT, AND ONE-HALF TO C. E. DOOLEY, OF PHILMONT, NEW YORK

SOLIDIFIED ALCOHOLIC FUEL

No Drawing.   Application filed November 13, 1930.   Serial No. 495,523.

My present invention relates broadly to improvements in the production of a colloid mass for use as a fuel, commonly known as "canned heat"; and more particularly it is my purpose to provide a fuel of this general character which may be quickly and easily ignited, and which is characterized by a very intense and smokeless flame productive of greater heat value than other fuels on the market, and one which is high in heat units, which will not explode, nor quickly evaporate, and which can be readily extinguished after having been ignited, and which during the burning will leave very little ash or residue. I am well aware that so-called solidified alcohol is old as a heating means or fuel, but my present invention has to do with the formation of a fuel which combines the well known advantages of solidified alcohol, with others mentioned above and which will be apparent as the description proceeds.

In practice both the method and formula for the production of my fuel may be slightly changed in some respects. For instance it is possible to use vegetable fats and oils, animal fats, and fatty acids in the proportions hereinafter mentioned, in some cases. For that reason the right to make slight changes and modifications is especially reserved provided they fall within the spirit and concept of the invention as described in detail hereinafter and set forth in the claims.

The preferred formula for the production of my fuel may be briefly outlined as follows:—

| | |
|---|---|
| Ceylon cocoanut oil | 50 pounds |
| Crude palm oil | 12½ pounds |
| Pale rosin | 37½ pounds |
| Caustic soda lye 38° Bé. | 50 pounds |
| Water | 2½ pounds |
| 96 percent alcohol | 8 ounces (about) |

In operation the 50 pounds of Ceylon cocoanut oil is placed in a suitable vessel and the remaining ingredients mixed therewith according to the following method:—

The cocoanut oil (Ceylon cocoanut oil) and rosin are melted over a moderate fire. The palm oil is then added and also melted. The melted rosin fat is strained and when it shows a temperature of about 176 degrees Fahr. it is stirred in the lye in a fine jet. When combination has been effected, the water is added to the thick colloid mass, which is thereby rendered somewhat more liquid by the addition. The alcohol is now crutched in and the mass is permitted to rest for about an hour; the pan or receptacle being well covered. A more intimate union is thereby produced. The somewhat thick, transparent colloid is then brought into the frame, again drawn through with the crutch and allowed to stand without being covered. To his emulsification agent is added 75 per cent of methyl alcohol formula #1, and the whole heated to a boiling point after which it is allowed to cool; the colloid thus formed being then ready for use. As heretofore mentioned, vegetable fats and oils, and animal fats and fatty acids may be used in the proportions as stated in some cases with advantage. The resulting product forms a desirable fuel, with the advantages mentioned and apparent from the preceding description.

It is believed that the ingredients of my formula, and the method of mixing the same to produce my desirable fuel will be apparent from the foregoing, but since modifications in proportionate quantities and the like may be desirable to conform to certain trade conditions, it is desired to again point out that the scope of my invention should only be determined by the claims appended hereto.

I claim:—

1. A fuel consisting of Ceylon cocoanut oil, 50 pounds; crude palm oil, 12½ pounds; pale rosin, 37½ pounds; caustic soda lye of 38° Bé., 50 pounds; water, 2½ pounds; and 96 percent alcohol, 8 ounces.

2. A fuel consisting of a mixture of cocoanut and palm oil in the proportions of about four to one respectively, a mixture of pale rosin and caustic soda lye, there being somewhat less rosin than lye; said latter mixture being incorporated with the first mixture, and water and alcohol added, to produce a solid colloid to be used as a fuel.

3. A solidified fuel, consisting of a mixture of Ceylon cocoanut oil and crude palm oil, there being approximately four times, by weight, as much Ceylon cocoanut oil as crude palm oil in the mixture; of pale rosin and caustic soda lye, there being approximately two-thirds as much rosin as there is caustic soda lye in the mixture; said first named mixture weighing approximately sixty-two and one-half pounds; and said second named mixture weighing approximately eighty-seven and one-half pounds; and said latter mixture being incorporated with the first mixture, and small percentages of water and alcohol added to produce a solid colloid.

In testimony whereof, I affix my signature hereunto.

KENNETH GEORGE BIERLICH.